Dec. 25, 1962   J. FOUFOUNIS ETAL   3,069,959
MEANS FOR TEACHING MUSIC
Filed April 5, 1960   4 Sheets-Sheet 1

Dec. 25, 1962   J. FOUFOUNIS ETAL   3,069,959
MEANS FOR TEACHING MUSIC
Filed April 5, 1960   4 Sheets-Sheet 2

Dec. 25, 1962   J. FOUFOUNIS ETAL   3,069,959
MEANS FOR TEACHING MUSIC
Filed April 5, 1960   4 Sheets-Sheet 4

United States Patent Office 3,069,959
Patented Dec. 25, 1962

3,069,959
MEANS FOR TEACHING MUSIC
Jean Foufounis and Chantel Foufounis, nee Sordoillet, both of 17 Ave., Dapples, Lausanne, Switzerland
Filed Apr. 5, 1960, Ser. No. 20,150
Claims priority, application Switzerland Apr. 8, 1959
12 Claims. (Cl. 84—477)

Empirical pedagogic methods are well-known for teaching languages or music; in the case of music the pedagogic methods consist in the preliminary studying of solfeggio and then in the methodical practising of scales for the formation of the ear and acquisition of the desired reflexes and muscular ability. In the case of languages, such methods consist in proceeding with a systematic study of grammar and syntax. As to the empirical method, it consists, in the case of music, in tentative efforts for training the pupil's ear and muscular reflexes, while, in the case of languages, it consists in staying in the country in which the language to be learnt is spoken.

Another method has been developed with excellent results for the teaching of foreign languages. It consists in following simultaneously a written text, while listening to its record spoken with a correct accent. The visual and auditive memory of the pupil are thus resorted to simultaneously, said method allowing an unlimited repetition of the spoken record. The application of said method to the teaching of music is possible, in principle, provided, however, the pupil is bestowed with an excellent ear. In practice, said condition is satisfied only rarely, since, in fact, the teaching of music has precisely for its object the formation of the pupil's ear.

Our invention has for its object a method for the teaching of music and an apparatus for the execution of said method, the purpose of which is to guide and to develop jointly the visual memory and the auditive memory of the pupil, together with his muscular reflexes, so as to cut out all losses of time arising with a teaching by tentative efforts. According to our invention, the pupil is guided by visual signals, the locations of which correspond to the successive points of the music instrument at which the pupil is to play the latter, so as to produce the notes, the sequence of apparition of said signals corresponding to a predetermined melody.

The apparatus for executing said method includes an arrangement storing indications corresponding to the successive notes of a predetermined melody, at least one reading head for said indications and visual signalling members selectively controlled by the indications read by the head and of which the positions correspond to the points producing the desired notes in the music instrument, the arrangement being such that said signalling members are controlled in accordance with the normal sequence of the notes forming a predetermined melody.

The accompanying drawings illustrate, by way of example, the operation of our improved method, together with various embodiments of the apparatus for the execution of said method. In said drawings.

According to said method, the pupil is guided during his practising by visual signalling means 1 distributed in registry with the point 2 at which the pupil is to act through pressure, striking or pinching, with a view to producing the corresponding notes. Said signalling members flicker in a sequence corresponding to the melody to be played and they are actuated by a control system 3. The latter may be controlled in its turn by an automatic arrangement 4 in which the indications corresponding to the melody are stored, so as to be transmitted as required. 5 designates a member which allows adjusting the speed of succession of the indications provided by said arrangement. The latter may be constituted either by a mere pin-carrying roll, or else, by a strip provided with projecting elements, a magnetic strip or wire record, a phonographic record, an apparatus operating with perforated cards or strips, a scale-carrying ruler or film cooperating with a photo-electric reader, or else, an electronic memory. Of course, such arrangements may be coupled not only with the means transmitting the indications stored thereby, but also with recording means.

Said method is applicable to all music instruments in which the pupil's fingers control keys, as in the case of a piano, a harpsichord, a mechanical or electrical organ, or strings, as in the case of cellos, or else, strings and keys simultaneously, as in the case of a guitar, a mandolin or a banjo. Similarly, it is applicable to an instrument requiring the use of an auxiliary control member such as a hammer, in the case of xylophones for action on predetermined points of the instrument.

The method disclosed shows the advantage of permanently guiding the pupil through his eyes, so that he can speedily and without any hesitation obtain rapidly automaticity of his movements, until he is sufficiently sure of himself and can do without any guide.

Said method is capable of further modifications. It is possible, in particular, to retain the signals in their operative position as long as the pupil has not acted on the corresponding point of the music instrument. It is also possible to guide the pupil so that he may ascertain the exact moment at which he is to act on the point of the instrument corresponding to the signal which has urged him to act. Furthermore, the signals corresponding to the melodies to be played by the left hand and by the right hand respectively may be produced independently, so as to allow the pupil to practice with his left hand and with his right hand separately.

Lastly, instead of controlling the signals by means of a record or a stored memory, it is possible to produce said signals by a second music instrument which is played by the teacher.

Figure 1:
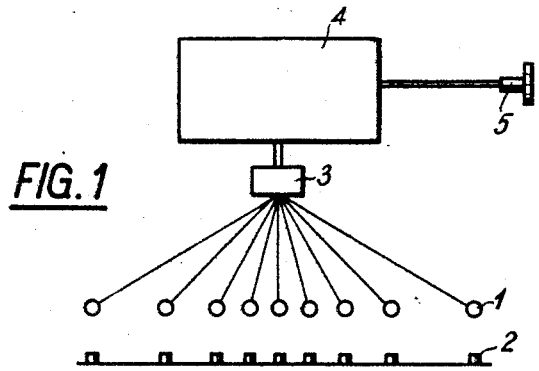
FIG. 1 is a diagrammatic illustration of the illuminating means which serve for the execution of my invention.
Figure 2:
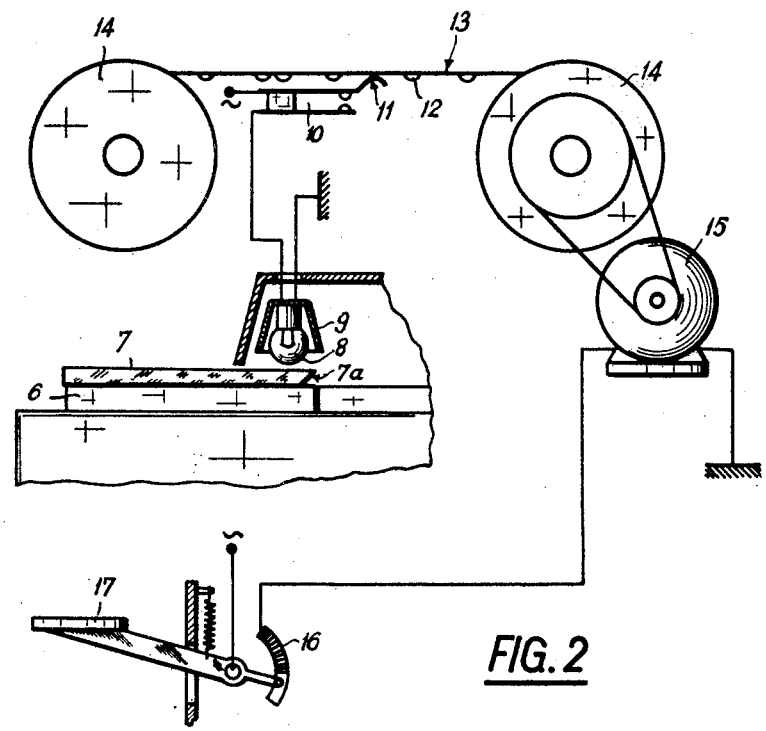
FIG. 2 is a diagrammatic illustration of a first embodiment.

In FIG. 2, it is assumed that the music instrument to be played is a piano, of which only a key 6 is illustrated. Said key is covered by a glass plate 7 which is rendered luminous, throughout its surface, by the reflection on a silvered bevelled edge 7a of the rays produced by a bulb 8 surrounded by a reflector 9, the surface of the bulb being at least partly ground, so as to diffuse said rays. Said bulb 8 is controlled by a switch 10, of which a contact-piece 11 is actuated by the projections 12 secured to a strip 13 wound over two spools 14. The latter are controlled by a motor 15, the speed of rotation of which is adjusted by a rheostat 16 controlled by a pedal 17. The strip 13 carries, of course, a number of rows of projections corresponding to the number of keys on the piano, each of said rows moving in front of a switch 10 controlling a corresponding bulb 8. Said projections are arranged with reference to each other in a manner such that the ignition of each bulb is obtained exactly at the moment at which the pupil is to hit the corresponding key.

When the pupil wishes to practise, he starts the arrangement, adjusts the speed of unwinding of the strip off one spool by acting on the pedal 17 to match said speed to his ability and he depresses the piano keys in succession at the moments at which they are illuminated. An arrangement which is not illustrated providing a rapid movement of the strip allows furthermore a repetition, as required, of any desired portion of the desired melody.

The second and third embodiments relate to keyboard instruments provided with means for stopping the progression of the record at the moment at which a signal is produced and for releasing the record again for further progression when the pupil has actually acted on the point corresponding to the signal on the music instrument.

The second embodiment (FIG. 3) is applicable to a piano, of which only a key 21 pivotally secured at 22 is illustrated. Said key is provided with an inner chamber 23 closed by a transparent or translucent blade 24 and containing a signalling lamp 25 corresponding to the lamp 8 of FIG. 2 and said lamp 25 is inserted in parallel with an electromagnet 26. The latter controls a key feeler 27 carrying two small upwardly directed projections above the level of the key when the electromagnet is inoperative.

Each key is provided with a contact blade 29 cooperating for the inoperative position of the key with a corresponding contact-piece 30, 30a . . . arranged after the manner of a comb 31, the contact blade 29 cooperating, in contradistinction, upon depression of the key, with a corresponding contact-piece 32, 32a . . . forming another comblike structure 33. The comb 31 is connected through a switch 34 with a relay 35 controlling a small blade 36 adapted, when the relay is not energized, to close the switch 37. On the other hand, the comb 33 is grounded through a resistance 38, the value of which is equal to that of the relay 35.

The melody is recorded on a perforated strip 39 wound over two spools 40 driven into rotation by the electric motor 41, fed by a supply of current 42 and the speed of which is adjusted by the rheostat 43. The grounding is obtained either through the contact-pieces 36, 37 and 44, or through the agency of a further contact-piece 45, according to the position of the rocking contact-piece 46. In the first case, the motor is driven in the normal direction of unwinding of the perforated strip, as shown by the arrow F, whereas, in the second case, it is driven in the opposite direction, so that the pupil may shift the record rearwardly with a view to practising the melody again. 47 designates a further supply of current feeding in parallel the record feelers 48 corresponding to the different keys and adapted to engage the corresponding brushes 49 at each passage of a perforation in the perforated strip. Each brush feeds an electric circuit cooperating with one of the keys and passing through the corresponding lamp 25 and electromagnet 26, the grounding being obtained through the agency of the comb 31, of the relay 35 and of the contact-piece 44, or else, through the agency of the comb 33 and of the resistance 38. For sake of clarity, we have illustrated only thre record feelers 48, 48a . . . and brushes 49, 49a . . . their illustrations being superposed on the drawing.

Upon adjustment of the rheostat 43 and connection of the rocking contact-piece 46 with the cooperating contact-piece 44, as illustrated in the drawing, the perforated strip is unwound at the desired speed. As long as no perforation passes in registry with the record feelers 48 and the brushes 49, the keys remain inoperative. In contradistinction, as soon as such a perforation allows a corresponding circuit to be closed, the lamp 25 and the electromagnet 26 in the associated key are immediately energized, so that the key feeler 27 recedes inside the key against the action of its spring 28. At the same time, the relay 35 shifts the contact-piece 36, so as to break the circuit at 37, whereby the motor 41 is no longer energized and the strip remains stationary. As soon as the pupil sees the lamp 25 is ignited, he depresses the key 21, so as to bring the contact-piece 30 on the blade 29 in contact with the contact-piece 32 on the comb 33.

Under such conditions, the lamp 25 and the electromagnet 26 remain energized, while the relay 25 is deenergized, so that the blade 36 closes the switch at 37 and reenergizes the motor. As soon as the perforation which has operated a key circuit has moved beyond the corresponding brush, said key circuit is switched off, which extinguishes the lamp 25 and releases the key feeler 27, so that the latter hits the finger of the pupil through its small projections, whereby the pupil is aware that he is to release said key.

If the pupil wishes the melody to be unwound uninterruptedly, it is sufficient for him to deenergize the relay 35 by reversing the switch 34 and providing thus a grounded connection for the key circuit through 34a. Thus, the lamp 25 and the electromagnet 26 remain normally fed.

Figure 3:
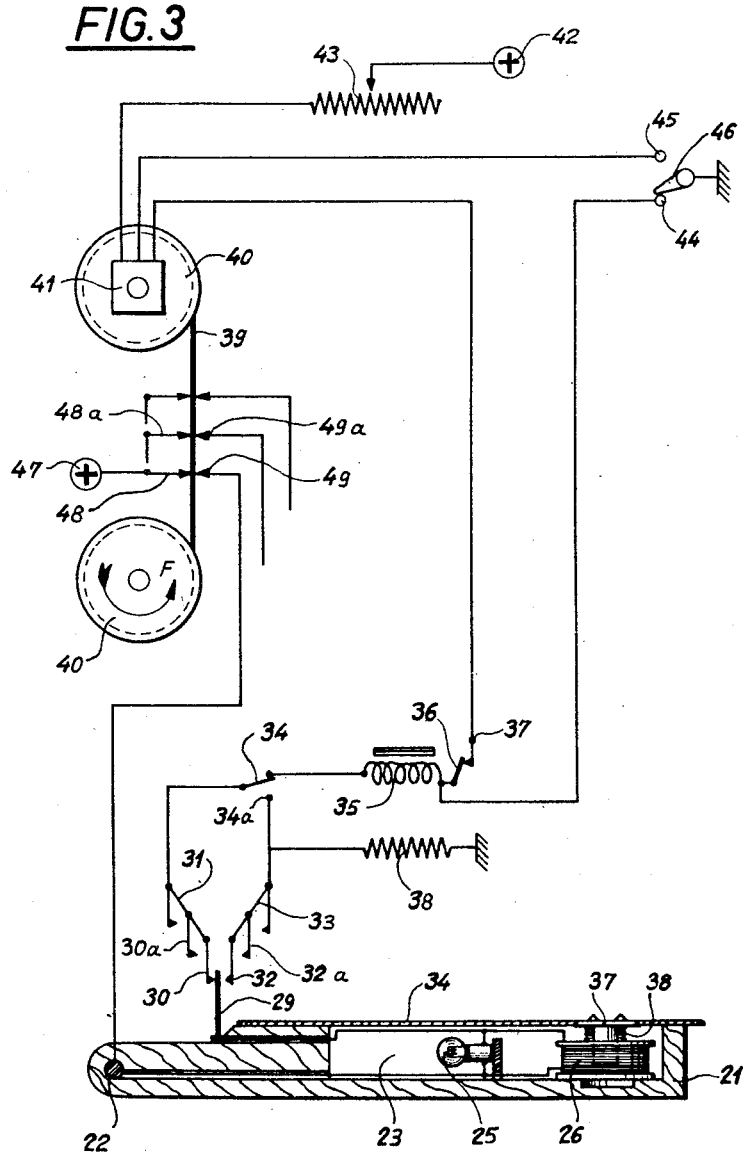
FIG. 3 illustrates a second embodiment.
Figure 4:
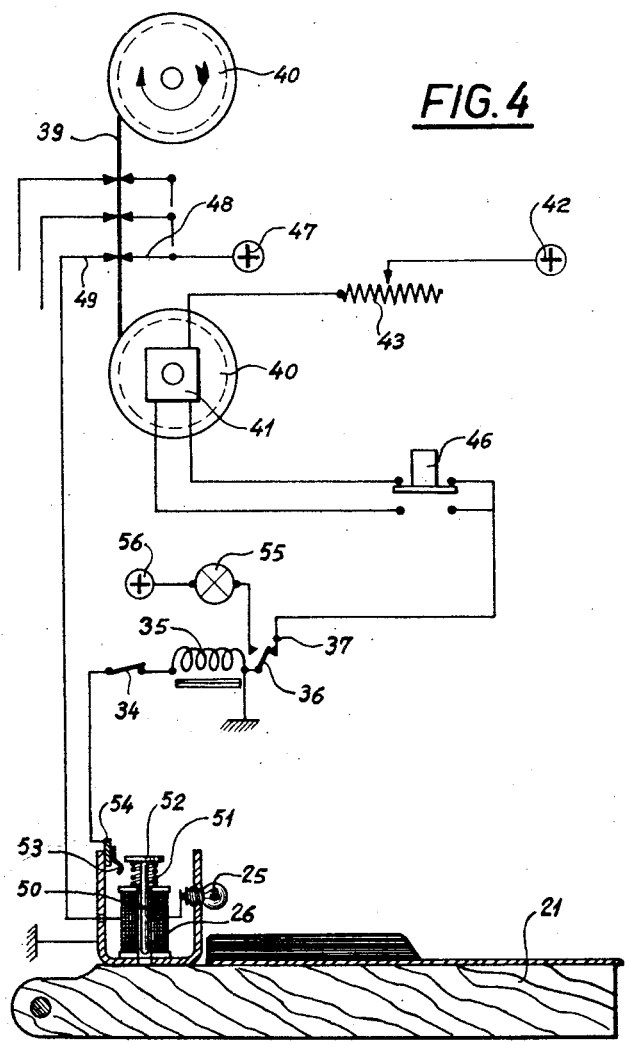
FIG. 4 illustrates a third embodiment.

The third embodiment (FIG. 4) illustrates members of the same type as in FIG. 3, which may be fitted removably on a piano of a conventional structure, without any considerable transformation of the latter. In fact, the wooden lath forming generally a stop for the keys is replaced by a mere metal member enclosing the different parts.

Said parts include, as in the case of FIG. 3, a lamp 25 inserted in parallel with an electromagnet 26, which latter controls, however, a plunger 50 subjected to the action of a spring 51 urging it constantly into its raised position. Said plunger is fed with current together with the electromagnet 26 and it includes a head 52 adapted to cooperate with a contact-piece 53 on a comb 54 which is connected in its turn with a relay 55 controlling, as precedingly, a switch 36—37 which opens and breaks the circuit feeding the motor 41, upon energization of the relay. The motor 41 is fed by the supply 42 through a rheostat 43 and controls the unwinding of the two spools 40, the direction of rotation of which may be reversed through operation of the switch 46. The record strip 39 moving between the two spools is read, as precedingly, by the record feelers 48 and brushes 49 fed with current from the supply 47.

As in the preceding case, as soon as a perforation in the strip allows a contact between a record feeler 48 and a brush 49, the corresponding lamp 25 and the electromagnet 26 are energized and current flows through the plunger 50. The latter moves downwardly against the action of the spring 51 and engages the key 30 with slight pressure. At the same time, the plunger head 52 engages the contact-piece 53, so as to actuate the relay 35, of which the contact-piece 36 opens at 37 the motor-energizing circuit.

When the pupil sees the lamp 25 in its ignited condition, he depresses the key, so that the key feeler may sink further and exert a pressure which is just sufficient for holding the key in its lowered position. At the same time, the head 52 of the plunger moves away from the contact-piece 53, so as to deenergize the switch 36—37, whereby the motor is started again. As soon as the further unwinding of the record strip opens the circuit passing through the record feeler 48 and the brush 49, the lamp 25 is extinguished and the electromagnet 26 releases the plunger 50 which rises again under the action of its spring 51. The pupil is immediately aware that the key is released to a slight extent and that he must then release it in his turn completely.

According to a first modification, which is not illustrated, the plunger may be located underneath the front section of the key, so as to urge said key upwardly at the moment at which the plunger is thus released by the electromagnet.

A tell-tale lamp 55 fed by a supply of current 56 may also show the pupil that the unwinding of the strip is stopped and, consequently, that it is necessary to depress a key, so as to start it moving again.

According to a further modification applicable to the three embodiments already described, the melody may be recorded by two storing memories, of which one corresponds to the playing by the right hand and the other to the playing by the left hand, in which case, obviously, two reading means are necessary. It is also possible to provide means for operating only one of the two records at a time, so as to allow the pupil to practise the part of only one hand at a time. Of course, it is also possible to control automatically at same time the reproduction of the other record, so that the pupil practising with a single hand may listen however to the complete melody.

It is possible to obtain identical results by resorting to a single memory, while separating the strip feelers 48 into two sections fed by independent supplies of current. An increase of the intensity of the current of one of said supplies increases the power of the electromagnets in a manner such that they may, in their turn, act on the keys and, consequently, play the melody, without the pupil interfering. Such a feeling of the two feeder sections would produce a piano playing in an entirely automatic manner.

Figure 5:
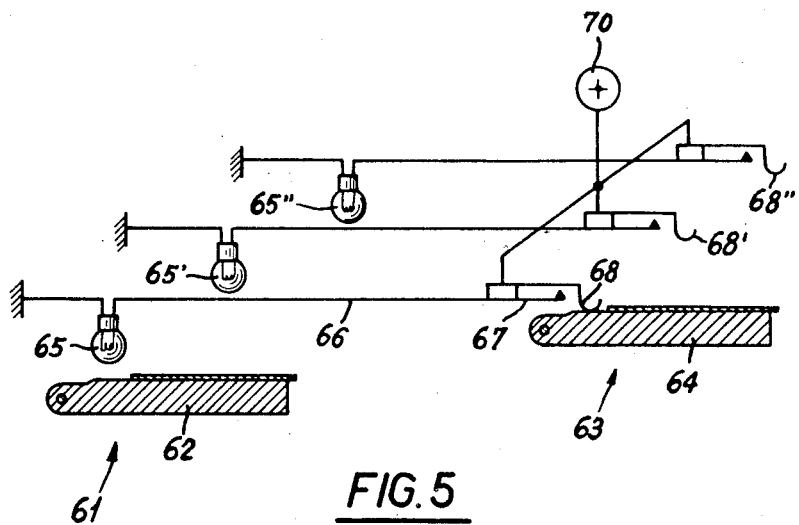
FIG. 5 illustrates a fourth embodiment.

FIG. 5 illustrates a fourth embodiment which includes a first piano 61 intended for the pupil and illustrated diagrammatically by a single key 62 and a second piano 63 intended for the teacher and also illustrated diagrammatically by a single key 64. Over the successive keys 62 are arranged signalling lamps 65, 65', 65", said lamps being fed by corresponding wires 66 leading to blades 67. Each of the latter is fitted in the vicinity of the corresponding key 64 of the teacher's piano and is adapted to cooperate with a second blade 68 engaging elastically said key 64 and incorporated with a comb 69 connected in its turn with the supply 70. When the teacher depresses one of the keys 64, he closes the switch by setting the blades 67 and 68 in contact, whereby the signalling lamp 65 is ignited, which shows the pupil that he is to depress the corresponding key 62. The structure shows the advantage of a considerable simplicity in operation and it is, consequently, of a comparatively low cost price.

This last embodiment shows the advantage of allowing the music teacher to make the pupil play a piece of music repeatedly under his own control, whereby the advantages of mechanical teaching according to the preceding embodiments are associated with those of an individualized personal lesson. The teacher may, as a matter of fact, follow his own judgment when listening to the playing of the pupil, so that the latter may repeat any desired passage of the melody and be corrected both as concerns time and fingering and also the position of his hands or the improper use of one finger instead of another.

Thus, the pupil may first listen once or twice to the melody as played by his teacher, while looking at the keys corresponding to the different sounds. This being done, he plays himself under constant control of his teacher, so that he may simultaneously exercise his visual memory, his auditive memory and his reflexes. Lastly, he may listen to the sounds produced by the keys depressed by himself and compare them to those he has just listened to. After the lesson, the pupil may return to practice on his own piano which may be provided with a record system of any of the types described hereinabove.

Figure 6:
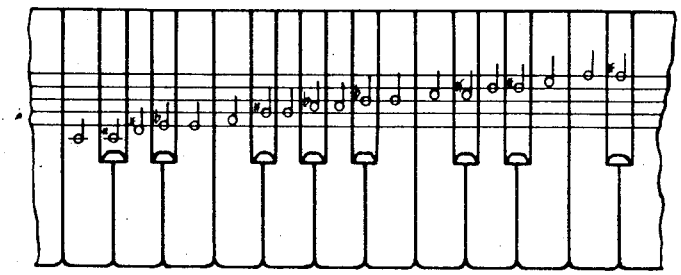
FIG. 6 illustrates a modification applicable to all of said embodiments.

Lastly, and as illustrated in FIG. 6, it is also possible to reproduce graphically on each key a stave showing the note corresponding to said key, so as to exercise in parallelism the auditive and the visual memory of the pupil. The five lines of the stave carrying the notes may advantageously be arranged in alignment throughout the keyboard, so as to make the continuous progression of the notes appear.

What we claim is:

1. An appaartus for teaching music on an instrument provided with a number of points, each producing, upon energization by the player, a predetermined note, said apparatus comprising a record of the successive notes of a melody, an electric current controlling the progression of the record, means adapted to read the record, elementary electric circuits, each energized by the reading of the corresponding note on the record, means controlled by each elementary circuit and illuminating the point of the instrument which produces, upon energization, the note corresponding to said elementary circuit, means whereby the energization of any elementary circuit breaks the first-mentioned circuit, and means whereby energization by the player of the point of the instrument illuminated by the corresponding illuminating means, closes said first-mentioned circuit to make the record resume its progression.

2. An apparatus for teaching music on an instrument provided with a number of keys, each producing upon depression a predetermined note, said apparatus comprising a record of the successive notes of a melody, means controlling the progression of the record, means for reading the record during its progression, elementary electric circuits, each energized by the reading of the corresponding note on the record, a lamp fed by each elementary circuit, reflecting means on each key adapted to be illuminated by the lamp fed by the elementary circuit, the energization of which is obtained by the reading of the note which is that produced by the depression of the key, means whereby the energization of any elementary circuit prevents operation of the means controlling the progression of the record, and means whereby depression of the key carrying the illuminated reflecting means releases said means controlling the progression of the record and thereby breaks the energized elementary circuit.

3. An apparatus for teaching music on an instrument provided with a number of points, each producing, upon energization by the player, a predetermined note, said apparatus comprising a record of the successive notes of a melody, an electric circuit controlling the progression of the record, means adapted to read the record, elementary electric circuits, each energized by the reading of the corresponding note on the record, means controlled by each elementary circuit and illuminating the point of the instrument which produces, upon energization, the note corresponding to said elementary circuit, a relay controlled by each elementary circuit and adapted, upon energization of the latter, to break the first-mentioned circuit, and means whereby energization of the point of the instrument illuminated by the corresponding illuminating means, de-energizes the relay controlled by the corresponding elementary circuit.

4. An apparatus for teaching music on an instrument provided with a number of points, each producing, upon energization by the player, a predetermined note, said apparatus comprising a record of the successive notes of a melody, an electric circuit controlling the progression of the record, means adapted to read the record, elementary electric circuits, each energized by the reading of the corresponding note on the record, means controlled by each elementary circuit and illuminating the point of the instrument which produces, upon energization, the note corresponding to said elementary circuit, a relay controlled by such elementary circuit and adapted, upon energization of the latter, to break the first-mentioned circuit, a witness lamp controlled by each relay, and means whereby energization of the point of the instrument illuminated by the corresponding illuminating means, de-energizes the relay controlled by the corresponding elementary circuit.

5. An apparatus for teaching music on an instrument provided with a number of points, each producing, upon energization by the player, a predetermined note, said apparatus comprising a record of the successive notes of a melody, an electric circuit controlling the progression of the record, means adapted to read the record, elementary electric circuits, each energized by the reading of the corresponding note on the record, means controlled by each elementary circuit and illuminating the point of the instrument which produces, upon energization, the note corresponding to said elementary circuit and adapted, upon energization of the latter, to break the first-mentioned circuit, a switch inserted in each elementary circuit and including a stationary contact-piece and a cooperating movable contact-piece carried by the point of the instrument illuminated by the means controlled by said elementary circuit, said movable contact-piece being shifted away from the stationary contact-piece upon energization of last-mentioned point to deenergize the corresponding relay.

6. An apparatus for teaching music on an instrument provided with a number of points, each producing, upon energization by the player, a predetermined note, said apparatus comprising a record of the successive notes of a melody, an electric circuit controlling the progression of the record, means adapted to read the record, elementary electric circuits, each energized by the reading of the corresponding note on the record, means controlled by each elementary circuit and illuminating the point of the instrument which produces, upon energization, the note corresponding to said elementary circuit, an electromagnet inserted in each elementary circuit and including a plunger core, a relay circuit energized by the movement of the plunger core out of an inoperative position upon energization of the corresponding elementary circuit, means whereby the relay circuit, when energized, breaks the first-mentioned circuit, and means whereby the energization of the point of the instrument illuminated by the corresponding illuminating means, shifts the plunger core back into its inoperative position to deenergize the relay circuit and to restore the first-mentioned circuit into its operative condition.

7. In an apparatus as claimed in claim 2, the provision of means adapted to project normally to a slight extent above each key to engage the player's finger on the latter, and means controlled by each elementary circuit and urging last-mentioned means into a collapsed position until the progression of the record has been resumed and has deenergized the corresponding elementary circuit.

8. In an apparatus as claimed in claim 2, the provision of an electromagnet fed by each elementary circuit and carried by the corresponding key, a core urged inwardly of the key by said electromagnet and projecting normally, when inoperative, to a slight extent above said key to engage the player's finger on the latter upon deenergization of the corresponding elementary circuit.

9. In an apparatus as claimed in claim 2, the provision of an electromagnet fed by each elementary circuit and carried by the corresponding key, a core for said electromagnet carried normally inside the corresponding key and adapted to project slightly above the latter into engagement with the player's finger upon energization of the electromagnet and to collapse back inside the key upon deenergization of the latter.

10. In an apparatus as claimed in claim 2, the provision of a continuous stave extending across the keyboard formed by the keys, said stave including on each key the note corresponding to the latter.

11. An apparatus for teaching music on an instrument provided with a number of points, each producing, upon energization, a predetermined note, said apparatus comprising a plurality of records of the successive notes forming a melody, an electric circuit controlling the progression of each record, means for reading each record, elementary electric circuits, each energized by the reading of the corresponding note on the corresponding record, means controlled by each elementary circuit and illuminating the point of the instrument which produces, upon energization, the note corresponding to said elementary circuit, means whereby the energization of any elementary circuit breaks the corresponding first-mentioned circuit, and means whereby the energization by the player of the point of the instrument illuminated by the corresponding illuminating means, closes said corresponding first-mentioned circuit to make the corresponding record resume its progression.

12. An apparatus for teaching music on an instrument provided with a number of points, each producing, upon energization by the player, a predetermined note, said apparatus comprising a record of the successive notes of a melody, means controlling the progression of the record, means adapted to read the record, elementary electric circuits, each energized by the reading of the corresponding note on the record, means controlled by each elementary circuit and illuminating the point of the instrument which produces, upon energization, the note corresponding to said elementary circuit, means whereby the energization of any elementary circuit renders the first-mentioned means inoperative, and means whereby the energization by the player of the illuminated point of the instrument, restores operation of said first-mentioned means.

References Cited in the file of this patent

UNITED STATES PATENTS

| | | |
|---|---|---|
| 973,391 | Severy | Oct. 18, 1910 |
| 1,607,226 | Wood | Nov. 16, 1926 |
| 1,613,400 | McAlbavey | Jan. 4, 1927 |
| 2,221,097 | Koehl | Nov. 12, 1940 |
| 2,223,009 | Rupp et al. | Nov. 26, 1940 |
| 2,544,722 | Pattyn | Mar. 13, 1951 |
| 2,645,969 | Daniel | July 21, 1953 |
| 2,811,082 | Isaacson | Oct. 29, 1957 |
| 2,940,351 | Chamberlin | June 14, 1960 |